Patented Aug. 19, 1930

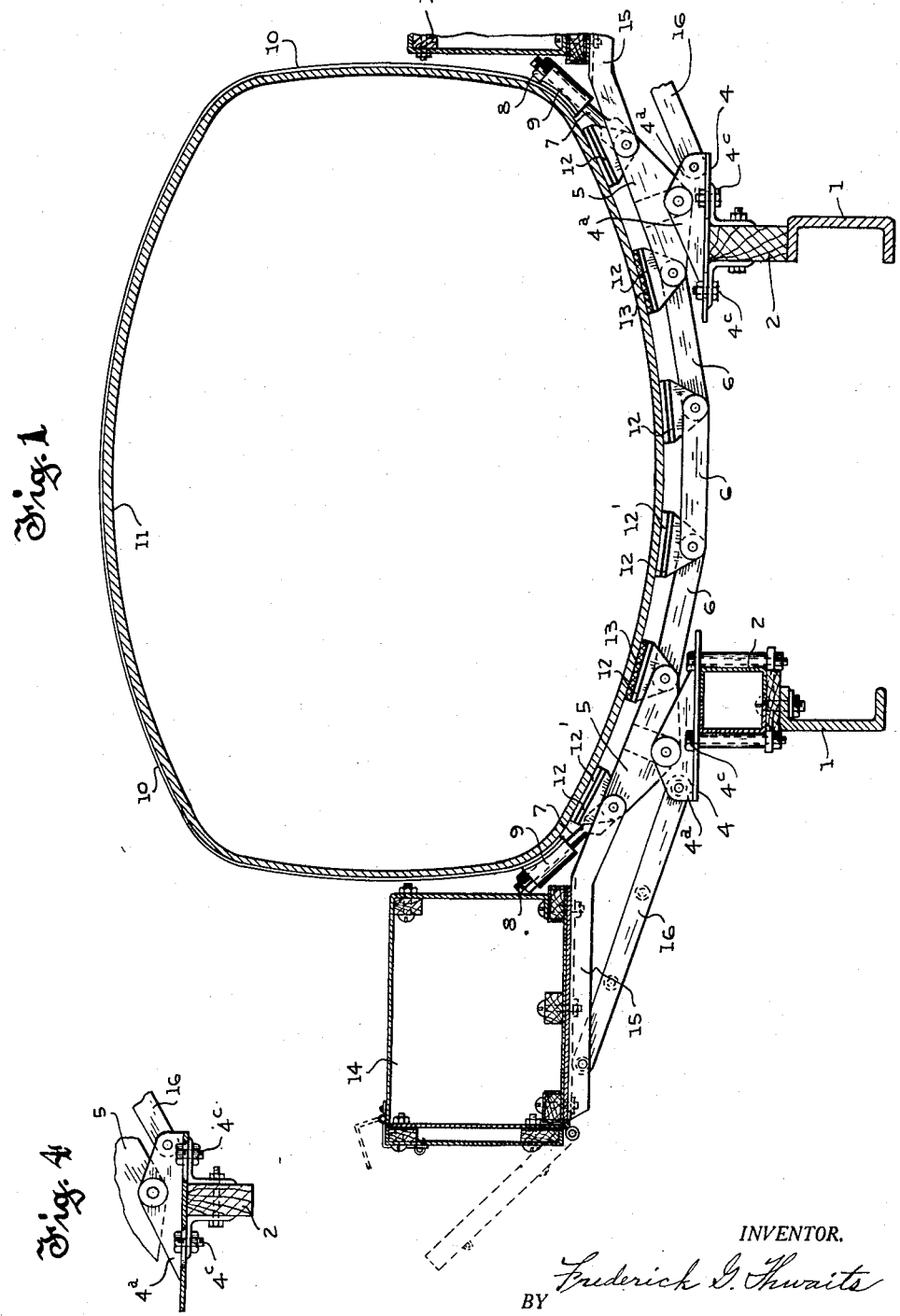

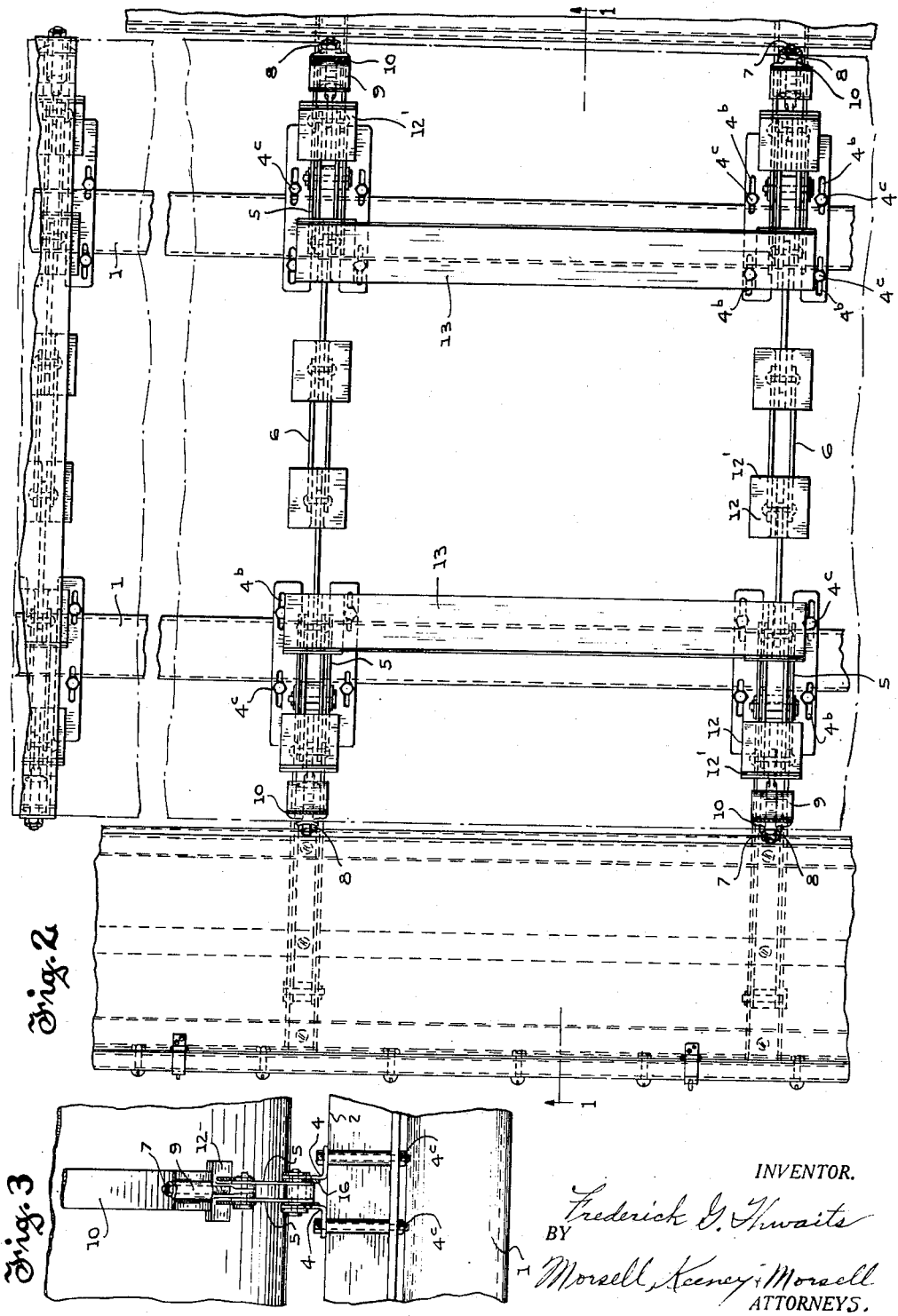

1,773,327

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

MOUNTING FOR VEHICLE TANKS

Application filed October 24, 1929. Serial No. 402,009.

This invention relates to tank motor trucks and the special object of the invention is to provide a simple and practical mechanism for strapping or fastening the tank onto the truck chassis, means being provided whereby said mechanism is adapted to be used in connection with tanks of various cross-sections, as more fully hereinafter set forth.

Referring to the drawing annexed—

Fig. 1 is a vertical transverse section of a truck-frame provided with my apparatus;

Fig. 2 is a plan view of a portion of a truck-frame equipped with my clamping apparatus, the tank being removed;

Figs. 3 and 4 are views of details hereinafter more particularly described.

In the drawing annexed, 1 designates a pair of chassis-beams upon each of which is mounted a longitudinal frame-member. One of these frame-members is shown as being made of wood and the other is a hollow steel beam; either may be used in connection with my invention. The tank supporting and clamping mechanism consists of a plurality of saddle-like structures fastened to the beam-members 2 at intervals along the truck-frame, the number of these saddle-like structures being determined by the length of the tank.

Each of the aforesaid saddle-like structures consists of a bracket-plate 4 fastened to the top-side of each beam 2, this plate being provided with a pair of upstanding flanges 4ª. Each plate 4 is also provided with slots 4ᵇ extending at right-angles to the beams 2, bolts 4ᶜ being employed to fasten the plate 4 to its beam 2. The slots in the plates 4 permit the plate to be adjusted transversely of the vehicle, so as to thereby enable the apparatus to be adjusted to trucks of different widths.

Pivotally mounted on each pair of the upstanding flanges 4ª are rocker-links 5, the axis being longitudinal of the vehicle, so that the links may rock transversely thereof. Connecting the inner ends of these rocker-links is a series of free links 6 and pivotally connected to the outer end of each of these rocker-links is a bolt 7 carrying a nut 8 at its outer end, which nut bears against the outer end of a lug 9 affixed to the adjacent end of a metal strap 10 surrounding the tank 11, so that, by screwing up the nuts 8, the strap 10 will be drawn tightly against the upper side and also against the side-walls of the tank, and the chain-like structure 5—6 will also be pressed tightly against the bottom of the tank through the medium of saddle-plates 12 pivotally mounted at the pivotal joints of the links and adapted to bear directly or indirectly against the bottom of the tank. In this way, it will be observed that the tank will be rigidly but removably mounted on the truck-frame and also that, by reason of the flexibility of the saddle-chain and the clamping-strap 10, the apparatus is adapted for use in tanks of different cross-sections.

Some of the saddle-plates 12 have yielding pads 12′ of brake lining material which bear directly against the bottom of the tank and, in some instances, opposite pairs of these saddle-plates on adjacent chains will be connected by longitudinal flat bars 13 which will rest their full length against the bottom of the tank and thus tend to give stability to the tank-support and also maintain proper spacing of the link structures.

My structure as above described lends itself nicely to the mounting of a running-board box 14 at each side of the tank, these boxes being used for the housing of hose, tools and utensils. To support each of these running-board boxes, I provide an upper arm 15 and a lower arm or strut 16, the upper arm being pivotally connected to the outer end of the adjacent rocker-link 5, while the inner end of the strut 16 is pivotally connected to the adjacent end of the flanges 4ª of the supporting-plate 4. The top edge of the arm 15 is horizontal so as to support the box in horizontal position, and the outer end of the strut 16 is pivotally connected to the arm 15 near the outer end thereof. In this way, the two arms 15 and 16 form bracket-arms for the running-board boxes.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What is claimed as new is:

1. A supporting-and-clamping apparatus for truck tanks embodying a plurality of flexible chains spaced along the length of the truck and mounted on the truck-frame, a plurality of flexible straps enveloping the upper side and side-walls of the tank, and means for adjustably connecting the ends of these straps to said chains.

2. A supporting-and-clamping apparatus for truck tanks embodying a plurality of flexible chains spaced along the length of the truck and mounted on the truck-frame, a plurality of flexible straps enveloping the upper side and side-walls of the tank, and means for adjustably connecting the ends of these straps to said chains, each of said chains at its outer end embodying a rocker-link rockable on the adjacent truck-beam.

3. A supporting-and-clamping apparatus for truck tanks embodying a plurality of flexible chains spaced along the length of the truck and mounted on the truck-frame, a plurality of flexible straps enveloping the upper side and side-walls of the tank, and means for adjustably connecting the ends of these straps to said chains, each of said chains embodying a link rockably mounted on the support which is transversely adjustably mounted upon the adjacent truck-beam to adapt the apparatus for trucks having differently-spaced truck-beams.

4. A supporting-and-clamping apparatus for truck tanks embodying a plurality of flexible chains spaced along the length of the truck and mounted on the truck-frame, a plurality of flexible straps enveloping the upper side and side-walls of the tank, and means for adjustably connecting the ends of these straps to said chains, each of said chains embodying a rockable link at its outer end, a plurality of saddle devices for engaging the bottom of the tank, and a tightening-bolt pivotally connected to the outer end of each rockable link and to the adjacent end of one of the straps.

5. A supporting-and-clamping apparatus for truck tanks embodying a plurality of flexible chains spaced along the length of the truck and mounted on the truck-frame, a plurality of flexible straps enveloping the upper side and side-walls of the tank, and means for adjustably connecting the ends of these straps to said chains, each of said chains embodying a plurality of pivotally-connected links and a plurality of upstanding pivotal saddle-members adapted to form rests for the bottom of the tank.

6. A supporting-and-clamping apparatus for truck tanks embodying a plurality of flexible chains spaced along the length of the truck and mounted on the truck-frame, a plurality of flexible straps enveloping the upper side and side-walls of the tank, means for adjustably connecting the ends of these straps to said chains, each of said chains embodying a plurality of pivotally-connected links and a plurality of upstanding pivotal saddle-members adapted to form rests for the bottom of the tank, and means lying against the bottom of the tank for connecting opposite pairs of these saddle members carried by adjacent chains.

7. A supporting-and-clamping apparatus for truck tanks embodying a plurality of flexible chains spaced along the length of the truck and mounted on the truck-frame, a plurality of flexible straps enveloping the upper side and side-walls of the tank, means for adjustably connecting the ends of these straps to said chains, each of said chains at its outer end embodying a rocker-link rockable on the adjacent truck-beam, and running-board-box supporting arms, one of which is connected at its inner end to the outer end of the adjacent rocking link, and the other of which is connected to the support for said rockable link.

8. A supporting and holding apparatus for truck tanks embodying connected together links having tank engaging plates, a strap, bolts adjustably and pivotally connecting the strap to the outer links, and truck attaching members pivotally connected to some of the links.

In testimony whereof, I affix my signature.

FREDERICK G. THWAITS.